United States Patent [19]

Strauss

[11] 4,376,550
[45] Mar. 15, 1983

[54] VEHICLE CANOPY

[75] Inventor: J. Gerrold Strauss, Portland, Oreg.

[73] Assignee: PACCAR Inc., Bellevue, Wash.

[21] Appl. No.: 268,679

[22] Filed: Jun. 1, 1981

[51] Int. Cl.³ .................................. B62D 25/06
[52] U.S. Cl. .............................. 296/102; 180/89.13; 405/303
[58] Field of Search ............... 296/102, 180, 189; 280/756; 180/89.12, 89.13; 293/126, 50, 150, 154, 155, 118, 127; 114/219; 405/211, 212, 303; 299/12; 175/219, 319, 320

[56] References Cited

U.S. PATENT DOCUMENTS

| 2,943,885 | 7/1960 | Fritzmeier | 296/102 |
|---|---|---|---|
| 3,259,211 | 7/1966 | Ryskamp | 187/9 |
| 3,336,074 | 8/1967 | Barnes et al. | 296/102 |
| 3,398,984 | 8/1968 | Ajero | 296/1 |
| 3,584,897 | 6/1971 | Frantz | 280/150 C |
| 3,656,803 | 4/1972 | Brown | 296/102 |
| 3,713,688 | 1/1973 | Monroe | 296/107 |
| 3,829,121 | 8/1974 | Ahrendt | 280/150 C |
| 3,890,916 | 6/1975 | Tümmers | 114/219 |
| 3,912,297 | 10/1975 | Mitsuishi et al. | 280/150 C |
| 3,917,310 | 11/1975 | Mitsuishi | 280/150 C |
| 3,934,679 | 1/1976 | Lieptz | 187/1 R |
| 4,011,957 | 3/1977 | Bendtsen | 214/82 |
| 4,065,167 | 12/1977 | Wright | 296/28 C |
| 4,078,629 | 3/1978 | Kutay et al. | 180/89.13 |
| 4,095,839 | 6/1978 | Lawrence et al. | 296/28 C |
| 4,173,371 | 11/1979 | Kopas | 296/137 R |
| 4,202,565 | 5/1980 | Mosch | 280/756 |
| 4,266,818 | 5/1981 | Hightower | 293/150 |

OTHER PUBLICATIONS

Pyott-Boone Brochure.
EIMCO Brochure.

Primary Examiner—Joseph F. Peters, Jr.
Assistant Examiner—Joseph G. McCarthy
Attorney, Agent, or Firm—Klarquist, Sparkman, Campbell, Leigh, Whinston & Dellett

[57] ABSTRACT

This invention provides an impact-absorbing canopy for a vehicle. The canopy includes the following: (1) a main section having supports extending over the operating station, with first and second longitudinally-spaced pivots mounted to the supports; (2) an impact section having first and second pivot arms pivotally mounted to and extending laterally from the first and second pivots, respectively, the first and second pivot arms including first and second pivotal cover mounts, respectively; and (3) an impact section cover plate pivotally mounted to the first and second pivotal cover mounts, positioned above in concealing relation with the first and second pivot arms and the first and second pivots so that the impact section cover plate is mounted to pivot in a fore-and-aft direction.

10 Claims, 3 Drawing Figures

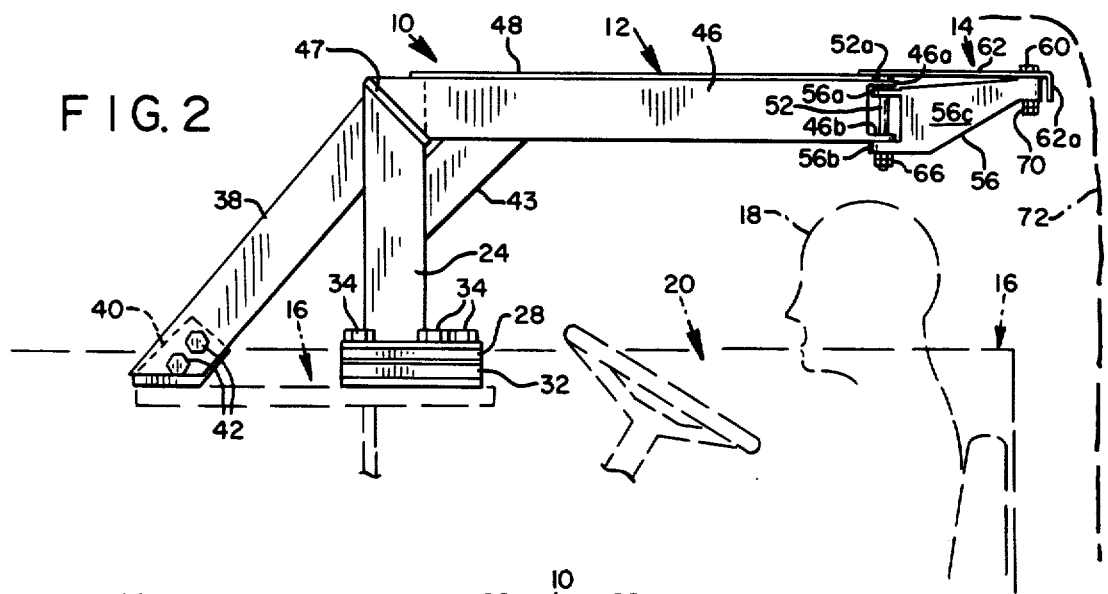
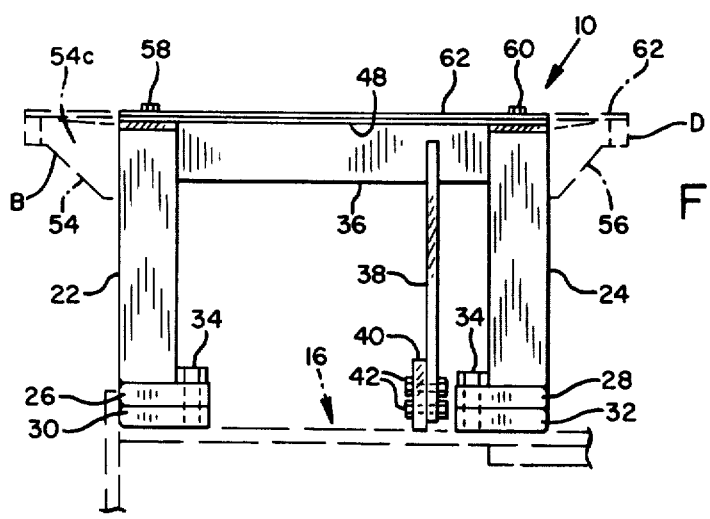
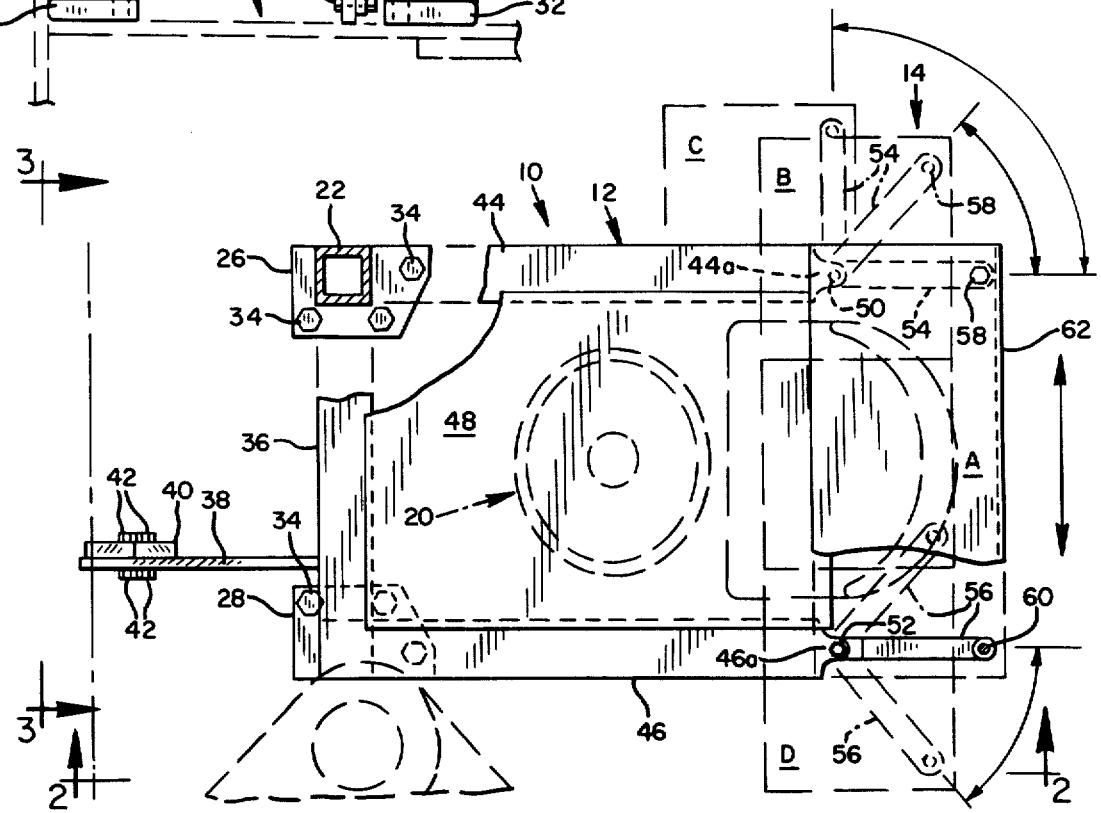

VEHICLE CANOPY

BACKGROUND OF THE INVENTION

This invention relates to an impact-absorbing vehicle canopy. More particularly, the invention pertains to a canopy. More particularly, the invention pertains to a canopy for a low-profile mining vehicle in which at least a portion of the canopy is displaceable in a fore-and-aft direction in order to minimize damage to the canopy in the event of impact with the mine walls.

Safety canopies are often provided on underground mining vehicles in order to protect the vehicle operator from falling debris. Such canopies are an absolute necessity on low-profile mining vehicles which are adapted for low overhead coal mines. Such mines may have a height of only 48 inches or so and often do not have adequately finished overhead surfaces.

The operating station in a low-profile mining vehicle has conventionally been positioned adjacent the side of the vehicle because, first, this enables the operator to easily position his vehicle with respect to one of the side walls of the mine, and second, such location simplifies the positioning of the drive train or other vehicle drive components on the opposite side of the vehicle. Canopies for the operating stations of low-profile vehicles have conventionally taken two basic forms. The first and simplest form merely consists of a four-sided cover supported by posts at each corner. This type of canopy is typically the strongest and easiest to produce, but it has several disadvantages. First, there must be a strong enough surface to support each of the four posts. Since, as noted above, the operating station is typically positioned adjacent the side of the vehicle, support means may not be present for the two outboard posts. This is particularly true when, as is often the case, the canopy is added by vehicle designers as almost an afterthought. A second disadvantage of this four post construction is that the two outboard posts obstruct the line of vision of the operator. A third and perhaps most important drawback with the four post type construction is that it often does not provide adequate protection to the operator since, on some vehicles, he is forced to lean in an outboard direction to determine the position of the vehicle. The operator would thus be in an exposed position when leaning outwardly in this fashion.

Due to the above reasons, the use of cantilevered canopies for low-profile mining vehicles has greatly increased over the last few years. Cantilevered canopies are typically supported by a pair of posts which are mounted inboard of the operating station and which extend, in a lateral direction, over the operating station, thereby protecting the operator. Thus, the posts which previously had been mounted to the lateral periphery of the vehicle are dispensed with, thereby eliminating the obstruction to the vision of the operator which was present in the four post configuration. Cantilevered canopies also sometime extend slightly beyond the lateral periphery of the vehicle in order to protect the operator in the event he feels the need to lean outwardly.

Despite the desire to protect the operator who is leaning outwardly beyond the lateral periphery of the vehicle, vehicle manufacturers have been reluctant to extend cantilevered canopies in this manner. The primary reason for this reluctance is because, with the canopy overhead and out of the line of vision of the operator, the operator may inadvertently direct his vehicle in such close proximity to the side wall of the mine that the lateral edge of the canopy contacts the mine wall. This is particularly possible when, as is often the case, the upper part of the mine wall is curved or arched toward the opposing wall. In fact, where such curvature exists, the canopy will often be the first part to contact the side wall even if the canopy does not extend beyond the periphery of the vehicle. When such contact does occur, the momentum of the moving vehicle will often result in substantial damage to the canopy even if only the outer edge contacts the side wall of the mine. Even more important than damage to the canopy is the fact that the canopy may be impacted downwardly toward the operator positioned therebelow. Faced with a rapidly collapsing canopy, the operator may not be able to instantly stop the vehicle. Thus, the danger of serious injury to the operator exists.

Prior art patents fail to provide a solution to the aforedescribed problems. The following U.S. patents all teach the use of canopies which are pivotable or otherwise displaceable, but such displacement is effected either manually by the operator or through a mechanism provided on the vehicle; none of these patents discloses means which automatically displace the canopy upon impact: U.S. Pat. Nos. 4,202,565; 4,173,371; 3,934,679; 3,917,310; 3,912,297; 3,829,121; 3,713,688; 3,584,897; 3,336,074; 3,259,211. Moreover, none of these patents discloses canopy means for low-profile vehicles. The following U.S. patents teach the desirability of a vertically reciprocable canopy for a low-profile vehicle, but fail to suggest any solution to the problems set forth above: U.S. Pat. Nos. 4,078,629; 4,065,167. Finally, U.S. Pat. No. 4,095,839 discloses a protective cover for a crane-type vehicle which is resiliently mounted, but similarly fails to provide any suggestion of a solution to the problem of developing an impact-absorbing canopy for a low-profile vehicle.

Hence, it is a primary object of the present invention to provide an improved vehicle canopy which effectively and reliably overcomes the aforementioned drawbacks and limitations of the prior art proposals. More specifically, the present invention has as its objects one or more of the following taken individually or in combination:

(1) The provision of a canopy for a low-profile mining vehicle which increases the safety to the vehicle operator without substantially increasing the cost of the vehicle;

(2) To provide a canopy for a low-profile mining vehicle which is less likely to collapse than prior art designs, but which does not obstruct the visibility of the operator;

(3) To provide an effective means of protecting the operator of a low-profile mining vehicle without substantially increasing the height of the vehicle;

(4) The development of a vehicle canopy which is simple in construction, yet which is strong enough to provide a high degree of safety to the operator of the vehicle; and (5) The provision of an improved mining vehicle canopy which may be mounted to conventional mining vehicles.

SUMMARY OF THE INVENTION

This invention responds to the problems presented in the prior art by providing an impact-absorbing canopy for a vehicle wherein the canopy includes the following: (1) a main section having support means extending over the operating station, with first and second longitudinally-spaced pivot means mounted to said support means; (2) an impact section having first and second pivot arms pivotally mounted to and extending laterally from the first and second pivot means, respectively, the first and second pivot arms including first and second pivotal cover mounting means, respectively; and (3) an impact section cover plate pivotally mounted to the first and second pivotal cover mounting means, positioned above in concealing relation with the first and second pivot arms and the first and second pivot means so that the impact section cover plate is mounted to pivot in a fore-and-aft direction.

The main section of the canopy normally includes first and second parallel support members, each of which extends laterally over the operating station. The pivot means may comprise pivot pins mounted adjacent the outboard ends of the support members. Each of the support members typically includes a substantially horizontal section and a substantially vertical section, with the vertical sections extending upwardly from the vehicle to abut the horizontal sections.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a plan view of one embodiment of the present invention depicting the impact section at various positions;

FIG. 2 is an elevation view taken along line 2—2 of FIG. 1 in a direction which looks toward the front end of the vehicle, also showing the adjacent mine wall in phantom; and FIG. 3 is an elevation view taken along line 3—3 of FIG. 1 looking across the vehicle from the side which is remote from the canopy.

DETAILED DESCRIPTION OF THE PREFERRED EMBODIMENTS

In that form of the invention chosen for purposes of illustration in the drawings, the canopy is indicated generally with the numeral 10. This depicted embodiment includes a main section 12 and an impact-absorbing section 14. As will become evident hereinbelow, the main section 12 is rigidly mounted to the vehicle 16, while the impact-absorbing section 14 is pivotally mounted to the main section. As shown best in FIGS. 1 and 2, the canopy 10 is adapted to extend over and protect the vehicle operator 18 who is controlling vehicle 16 from an operating station 20.

The depicted canopy 10 is of cantilevered construction, extending from first and second substantially vertical mounting posts 22 and 24, respectively. Each of the mounting posts 22 and 24 is permanently affixed, such as by welding, to an upper mounting plate 26 or 28. Each of these upper mounting plates 26 and 28 is adapted to be mounted to one of a pair of lower mounting plates 30 or 32 which are permanently affixed, such as by welding, to an upper surface of the vehicle 16. In order to mount the canopy 10 to the vehicle, a plurality of bolts, such as those shown at 34, are normally utilized.

The first and second mounting posts 22 and 24 extend upwardly and interconnect a first or a second support member 44 or 46 at a diagonal seam 47. These support members are normally parallel and extend laterally across vehicle 16 over operating station 20. A main section cover plate 48 extends between first and second support members 44 and 46, thereby providing protection to the operator.

A cross member 36 normally extends between first and second support members 44 and 46 adjacent their inboard ends. Cross member 36 thereby not only provides additional support for main section cover plate 48, but also provides additional structural integrity for the entire canopy 10. A mounting bracket 38 may also be included to provide further structural support for the canopy 10. In the depicted embodiment, mounting bracket 38 extends downwardly from cross member 36 at an oblique angle toward a bracket plate 40 which is typically welded to vehicle 16. Mounting bracket 38 may, as depicted, be mounted to bracket plate 40 by bolts 42. In the depicted embodiment a pair of diagonally-extending trusses 43 (only one of which appears in the figures) extend between first mounting post 22 and first support member 44, and between second mounting post 24 and second support member 46, respectively. It should be appreciated that, for certain applications, cross member 36, mounting bracket 38, and/or trusses 43 may be deleted. However, in order to provide the strongest possible canopy, these strengthening means are normally included.

In this discussion the terms "inboard" and "outboard" will be used to refer to various portions of canopy 10 and vehicle 16. "Inboard," of course, refers to that position which is closer to the center of the vehicle, while the term "outboard" refers to the position which is closer to the lateral periphery of the vehicle.

As shown best in FIG. 1, the outboard ends of first and second support members 44 and 46 include a pair of vertically-spaced, planar annuli 44a and b (not shown) or 46a and b. The annuli of the respective support members receive first or second pivot pins 50 or 52. As seen best in FIG. 2, pivot pins 50 and 52 include heads 50a (not shown) and 52a which are disposed flush with main section cover plate 48, and extend downwardly through support member annuli 44a and b or 46a and b, and through another pair of planar annuli 54a and b or 56a and b, which are mounted to first and second pivot arms 54 and 56. Thus, pivot pins 50 and 52 provide a pivotal connection between support members 44 and 46 and their respective pivot arms 54 and 56.

Pivot arms 54 and 56 each includes a broad, substantially-flat surface 54c and 56c to adapt these arms to receive hammer blows, for reasons to be explained below.

First and second pivot arms 54 and 56 receive first and second cover plate mounting pins 58 and 60 (alternatively referred to as cover plate mounting means), adjacent their outboard ends. As the name implies, first and second cover plate mounting pins 58 and 60 are designed to mount an impact section cover plate 62 to the canopy 10. Impact section cover plate 62 extends between and in concealing relation with first and second pivot arms 54 and 56. Its inboard edge extends slightly beyond the outboard edge of main section cover plate 48 to prevent any possibility of the edges of these cover plates abutting one another, and to thereby conceal first and second pivot pins 50 and 52. As noted above, since the heads 50a and 52a of the pivot pins do not extend above the surface of main section cover plate 48, there normally will not be a gap between the two cover plates which might otherwise permit debris to fall therethrough. Impact section cover plate 62 includes a skirt 62a which extends downwardly along the outboard periphery of canopy 10 in order to provide an additional degree of protection to the operator, while at the same time serving to conceal the first and second mounting pins 58 and 60.

Lock nuts 64 and 66 are threaded to the lower ends of first and second pivot pins 50 and 52, respectively, in order to permit the operator to regulate the amount of force which is necessary to pivot the impact-absorbing section 14 with respect to main section 12. For the same reason, lock nuts 68 and 70 are provided at the lower ends of first and second cover plate mounting pins 58 and 60.

Under normal conditions, the impact section cover plate 62 will be in the position depicted in solid lines in FIG. 1, and designated with the letter A. Positioned thusly, maximum protection is provided for the operator.

The side wall of the mine in which the vehicle 16 is designed to be used is depicted at 72 in FIG. 2. In the event that side wall 72 is contacted by impact-absorbing section 14 while the vehicle is moving in a reverse direction, impact section cover plate 62 will be displaced to a position approximating that shown in phantom at letter B in FIG. 1. In the event of a more serious collision, impact section cover plate 62 may be displaced as far as the position depicted in phantom at letter C, but it is unlikely that it will pivot any further than that. In the event the vehicle is moving forwardly at the time of impact, impact section cover plate 62 will be displaced to a position approximating that shown in phantom at letter D.

In the event of displacement of impact section 14 as a result of a collision, the operator would stop the vehicle and would work it back to its original position. This is normally done by merely pounding on one or both of the pivot arm flat surfaces 54c and 56c. It may be desirable in certain applications to include detent means which might tend to simplify this operation, but such means are normally not included, since it is desirable that the canopy be as simple and rugged as possible.

As seen in FIG. 2, the depicted impact section extends slightly beyond the lateral periphery of the vehicle 16. This is desirable to protect the operator even when he leans outwardly from his seat. In fact, it may be desirable to extend the impact-absorbing section even further beyond the periphery of the vehicle. Of course, this would not be advisable with a conventional rigid canopy which would be susceptible to damage and could therefore prove even more dangerous to the operator than if the canopy only extended to the periphery of the vehicle.

In other applications, such as where the vehicle will be operating in mines with low, rounded ceilings, it may be desirable that the impact section extend no further than the periphery of the vehicle. With such a ceiling configuration it is likely that the impact section would be the first portion of the vehicle to contact the mine wall, thereby reducing the possibility of serious damage to the vehicle.

Of course, it should be understood that various other changes and modifications of the preferred embodiment described herein will be apparent to those skilled in the art. Such changes and modifications can be made without departing from the spirit and scope of the present invention and without diminishing its attended advantages. It is, therefore, intended that such changes and modifications be covered by the following claims.

I claim:

1. An impact-absorbing canopy for covering the operating station of a vehicle, wherein the canopy comprises:
   a main section having support means extending over the operating station, with first and second longitudinally-spaced pivot means mounted to said support means;
   an impact section having first and second pivot arms pivotally mounted to and extending laterally from said first and second pivot means, respectively, said first and second pivot arms including first and second pivotal cover mounting means, respectively; and
   an impact section cover plate pivotally mounted to said first and second pivotal cover mounting means, positioned above in concealing relation with said first and second pivot arms and said first and second pivot means so that said impact section cover plate is pivotable in a fore-and-aft direction.

2. The canopy of claim 1 wherein said main section includes:
   mounting means which extend upwardly from the vehicle; and
   a main section cover plate which extends over the operating section and which has a lateral edge which terminates immediately inboard of said first and second pivot means; and
   wherein said impact section cover plate overlays at least said lateral edge of said main section cover plate.

3. The canopy of claim 2 wherein said first and second pivot means comprise first and second pivot pins.

4. The canopy of claim 3 wherein the respective upper ends of said pivot pins are no higher than the upper edge of said main section cover plate, so that said main section cover plate assists in supporting said impact section cover plate.

5. The canopy of claim 1 wherein said main section comprises first and second spaced mounting posts extending upwardly from the vehicle, and first and second substantially parallel support members, one end of each of said support members extending from the upper end of one of said first and second mounting posts, respectively, said support members extending over the operating station, and wherein said first and second pivot means comprise first and second pivot pins mounted adjacent the other ends of said first and second support members.

6. The canopy of claim 5 wherein said first and second mounting posts are longitudinally spaced, and wherein said first and second support arms extend from said mounting posts, over the operating station, in a lateral direction.

7. The canopy of claim 1 wherein said first and second pivotal cover mounting means each comprise a cover pin extending through its respective pivot arm and said impact section cover plate.

8. The canopy of claim 7 wherein said first and second pivot means comprise first and second pivot pins and wherein each pivot pin and cover pin includes means for adjustably tightening the respective pin to permit variation of the amount of force necessary to pivot said impact section.

9. The canopy of claim 1 wherein said first and second pivot arms each includes a broad surface for pounding upon to drive said impact section back to its original position once it has been pivoted.

10. An impact-absorbing canopy for covering the operating station of a low-profile vehicle, wherein the canopy comprises:
   first and second longitudinally offset mounting posts extending upwardly from the vehicle;
   first and second substantially parallel support members, rigidly mounted to the upper ends of said first and second mounting posts, respectively, said support members extending laterally across and above the operating station and having inboard and outboard ends;
   a main section cover plate extending between said first and second support members;
   first and second pivot pins mounted to said outboard ends of said first and second support members, respectively;
   first and second parallel, outwardly extending pivot arms having inboard and outboard ends, said inboard ends being mounted to said first and second pivot pins, respectively, to permit said pivot arms to pivot with respect to said support members;
   an impact section cover plate disposed above said first and second pivot arms, extending from at least slightly inboard of the outboard edge of said main section cover plate, to at least adjacent said outboard end of said pivot arms, said impact section cover plate being slidably disposed immediately above said main section cover plate; and
   first and second cover pins disposed adjacent said outboard ends of said first and second pivot arms, respectively, and extending upwardly to pivotally mount said impact section cover plate to said pivot arms.

* * * * *